(12) United States Patent
Wang et al.

(10) Patent No.: US 12,536,077 B2
(45) Date of Patent: Jan. 27, 2026

(54) IMPROVING DATA RESTORATION USING DYNAMIC OPTIMIZATION

(71) Applicant: INTERNATIONAL BUSINESS MACHINES CORPORATION, Armonk, NY (US)

(72) Inventors: Tian Jia Wang, Xian (CN); Bo Song, Xian (CN); Xiao Liang Ge, Xi'an (CN); Meng Ru Hou, Xi'an (CN); Qian Qian Zhang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 18/492,887

(22) Filed: Oct. 24, 2023

(65) Prior Publication Data

US 2025/0130903 A1   Apr. 24, 2025

(51) Int. Cl.
*G06F 16/00* (2019.01)
*G06F 11/14* (2006.01)

(52) U.S. Cl.
CPC ...... *G06F 11/1469* (2013.01); *G06F 11/1461* (2013.01); *G06F 2201/80* (2013.01)

(58) Field of Classification Search
CPC .... G06F 2201/815; G06F 3/065; G06F 3/067; G06F 9/455; G06F 12/10; G06F 16/188; G06F 16/113; G06F 16/20; G06F 16/30; G06F 16/40; G06F 16/50; G06F 16/60; G06F 16/70; G06F 3/0619;
(Continued)

(56) References Cited

U.S. PATENT DOCUMENTS 7,325,159 B2    1/2008   Stager
9,798,629 B1   10/2017   Shilane et al.
(Continued)

FOREIGN PATENT DOCUMENTS

CN    115586992 A    1/2023
CN    115858250 A    3/2023
WO   2025/087578 A1  5/2025

OTHER PUBLICATIONS

International Searching Authority, "Notification of Transmittal of the International Search Report and the Written Opinion of the International Searching Authority, or Declaration," Patent Cooperation Treaty, Nov. 26, 2024, 12 pages, International Application No. PCT/EP2024/072312.

*Primary Examiner* — Shyue Jiunn Hwa
(74) *Attorney, Agent, or Firm* — Lily Neff

(57) ABSTRACT

A method, computer system, and a computer program product are provided for backup and restoration of data. Data is obtained from a plurality of resources during a plurality of tasks. The resources are located in one or more computing networks. A plurality of parameters are extracted from obtained data. A table is generated and stored that includes the parameters extracted and an associated related task. A predict time is calculated based on the table for recovery of data when any of the resources become unavailable. A task priority is established based on calculated predict time and the table to optimize and improve the predict recovery time. A restoration model is generated based on updated restoration recommendation. The restoration model is to be used during resource unavailability or failure of one or more of the resources.

18 Claims, 9 Drawing Sheets

(58) Field of Classification Search
CPC ............. G06F 11/1458; G06F 11/1469; G06F 11/1446; G06F 11/1461; G06F 11/203; G06F 9/5088; G06F 11/1402; G06F 11/1466; G06F 2212/1016; G06F 2212/1044; G06F 11/3457; G06F 11/3668; G06F 11/3698; G06F 11/3006; G06F 11/3608; G06F 11/3696; G06F 2201/865; G06F 8/20; G06F 11/3672; G06F 16/00; G06F 8/00; G06F 8/60; G06F 9/4825; G06F 9/4887; G06F 11/1448; G06F 11/1451; G06F 2201/84; G06F 11/1435; G06F 11/2071; G06F 12/08; G06F 16/128; G06F 16/285; G06F 2009/45583; G06F 21/1082; G06F 21/562; G06F 21/565; G06F 21/568; G06F 2201/805; G06F 2201/82; G06F 2201/855; G06F 2212/151; G06F 2212/401; G06F 2221/034; G06F 3/0614; G06F 3/064; G06F 3/0647; G06F 3/0659; G06F 3/0674

See application file for complete search history.

(56) References Cited

U.S. PATENT DOCUMENTS

| | | | |
|---|---|---|---|
| 11,599,291 | B2 | 3/2023 | Malamut |
| 11,675,672 | B2 | 6/2023 | O'Mahony |
| 2007/0011677 | A1* | 1/2007 | Van De Ven ......... G06F 9/4825 |
| | | | 718/100 |
| 2012/0017027 | A1 | 1/2012 | Baskakov |
| 2019/0050321 | A1* | 2/2019 | Sapozhnikov ...... G06F 11/3664 |
| 2020/0334199 | A1* | 10/2020 | Wolfson ................ G06N 20/20 |
| 2023/0096974 | A1 | 3/2023 | Malamut et al. |
| 2023/0185619 | A1 | 6/2023 | Manley et al. |

* cited by examiner

| Recommend factor table - 510 | | | | | |
|---|---|---|---|---|---|
| Y | $f_{rd1}$ | $f_{rd2}$ | $f_{rd3}$ | ...... | $f_{rdn}$ |
| $Y_1$ | $y_{11}$ | $y_{21}$ | $y_{31}$ | ...... | $y_{n1}$ |
| $Y_2$ | $y_{12}$ | $y_{22}$ | $y_{32}$ | ...... | $y_{n2}$ |
| $Y_3$ | $y_{13}$ | $y_{23}$ | $y_{33}$ | ...... | $y_{n3}$ |
| .... | $y_{14}$ | $y_{24}$ | $y_{34}$ | ...... | $y_{n4}$ |
| $Y_k$ | $y_{15}$ | $y_{25}$ | $y_{35}$ | ...... | $y_{n5}$ |

FIG. 5

| | | $f_1$ | $f_2$ | $f_3$ | ...... | $f_n$ |
|---|---|---|---|---|---|---|
| Restore task parameter statistic table | 0 | $f_{10}$ | $f_{20}$ | $f_{30}$ | ...... | $f_{n0}$ |
| | 1 | $f_{11}$ | $f_{21}$ | $f_{31}$ | ...... | $f_{n1}$ |
| | 2 | $f_{12}$ | $f_{22}$ | $f_{32}$ | ...... | $f_{n2}$ |
| | 3 | $f_{13}$ | $f_{23}$ | $f_{33}$ | ...... | $f_{n3}$ |
| | | | | | | $f_{ns}$ |
| | s | $f_{1s}$ | $f_{2s}$ | $f_{3s}$ | ...... | |

610

| Restored data size | $f_1$ | $f_2$ | $f_3$ | ...... | $f_n$ |
|---|---|---|---|---|---|
| $m_0$ | average $f_{10}$ | average $f_{20}$ | average $f_{30}$ | ...... | average $f_{n0}$ |
| $m_1$ | average $f_{11}$ | average $f_{21}$ | average $f_{31}$ | ...... | average $f_{n1}$ |
| $m_2$ | average $f_{12}$ | average $f_{22}$ | average $f_{32}$ | ...... | average $f_{n2}$ |
| $m_3$ | average $f_{13}$ | average $f_{23}$ | average $f_{33}$ | ...... | average $f_{n3}$ |
| $m_s$ | average $f_{1s}$ | average $f_{2s}$ | average $f_{3s}$ | ...... | average $f_{ns}$ |

620

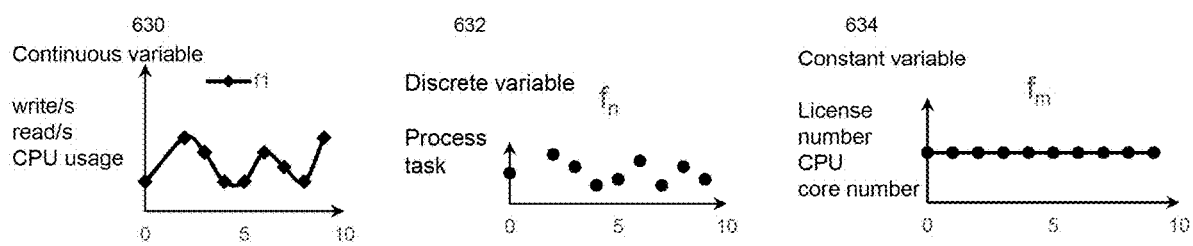

630 Continuous variable
write/s
read/s
CPU usage

632 Discrete variable $f_n$
Process task

634 Constant variable $f_m$
License number
CPU core number

FIG. 6

IMPROVING DATA RESTORATION USING DYNAMIC OPTIMIZATION

BACKGROUND

The present invention relates generally to the field of data management and more particularly to techniques for data restoration using a dynamic optimization techniques.

Maintaining data integrity is crucial in computing. Most gathered data reside on one or more servers and a backup system is crucial. This is because data loss is unavoidable and data backup is a good way of restoring important information. Files get accidentally deleted, servers crash, catastrophic natural events happen, loss of power affect data centers, and even cyberattacks sometimes affect data availability. Therefore, a good server backup and recovery solution protects valuable information and core system files from complete loss or damage.

In many instances, data maintenance and recovery may be a task performed by operations and maintenance teams. It is very important to reduce customer server downtime by conducting fast and effective data recovery. Unfortunately, this is not always an easy task due to the complexity of the network and the number of servers and the variations in software and hardware (patches, upgrades etc.) design implemented by each server or network.

Prior art provides some recovery options but does not provide a solution that can adequately deal with complex networks. Currently many challenges affect data recovery for system that generate large volume of data and in network environments with many varied components. Recovery time is also important which provides additional issues using current available art.

Consequently, it is desirous to provide a technique that addresses these prior art shortcomings. It is important to have a recovery system that can handle a large volume of data in complex environment such as cloud computing. Techniques to provide dynamic recovery of data quickly is also desirous.

SUMMARY

Embodiments of the present invention disclose a method, computer system, and a computer program product for backup and restoration of data. In one embodiment, a method is provided during which data is obtained from a plurality of resources related to a plurality of task performances. The resources are located in one or more computing networks. A plurality of parameters are extracted from the obtained data. A table is generated and stored that includes the parameters extracted and an associated related task. A predict time is calculated based on the table for recovery of data when any of the resources become unavailable. A task priority is established based on calculated predict time and the table to optimize and improve the predict recovery time. In one embodiment, task priority is updated when there are any user defined restoration recommendations. A restoration model is generated based on updated restoration recommendation. The restoration model is to be used during resource unavailability or failure of one or more of the resources.

In another embodiment, a computer system for providing backup and restoration of data is provided. The computer system comprises one or more processors, one or more computer-readable memories and one or more computer-readable storage media. It also includes program instructions, stored on at least one of the one or more storage media for execution by at least one of the one or more processors via at least one of the one or more memories, to obtain data from a plurality of resources related to a plurality of tasks performance. Each of the plurality of resources are located in one or more computing networks. The program instructions also include extracting a plurality of parameters from obtained data and generating and storing a table including the plurality of parameters extracted and an associated task related to each parameter. In addition there are program instructions, stored on at least one of the one or more storage media for execution by at least one of the one or more processors via at least one of the one or more memories, to calculate a predict time for recovery of data when any of the plurality of resources become unavailable based on the table. The program instructions also establish a task priority based on calculated predict time and said table generated to optimize and improve the predict time for recovery. A restoration model is generated based on updated restoration recommendation. The restoration model is used during resource unavailability or failure.

In another embodiment, a computer program product is provided for backup and restoration of data. The computer program product comprises one or more computer readable storage media and program instructions, stored on at least one of the one or more storage media for execution by at least one of the one or more processors via at least one of the one or more memories, to obtain data from a plurality of resources related to a plurality of tasks performance. Each of the plurality of resources are located in one or more computing networks. The program instructions also include extracting a plurality of parameters from obtained data and generating and storing a table including the plurality of parameters extracted and an associated task related to each parameter. In addition there are program instructions, stored on at least one of the one or more storage media for execution by at least one of the one or more processors via at least one of the one or more memories, to calculate a predict time for recovery of data when any of the plurality of resources become unavailable based on the table. The program instructions also establish a task priority based on calculated predict time and said table generated to optimize and improve the predict time for recovery. In one embodiment, task priority is updated by the program instructions when there are any user defined restoration recommendations. A restoration model is generated based on updated restoration recommendation. The restoration model is used during resource unavailability or failure.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings:

FIG. 5 is an example of a table generated according to one model using a plurality of parameters;

FIG. 6, is an illustration of one example generating a two-dimensional table of parameters; according to one embodiment;

DETAILED DESCRIPTION

Figure 1:
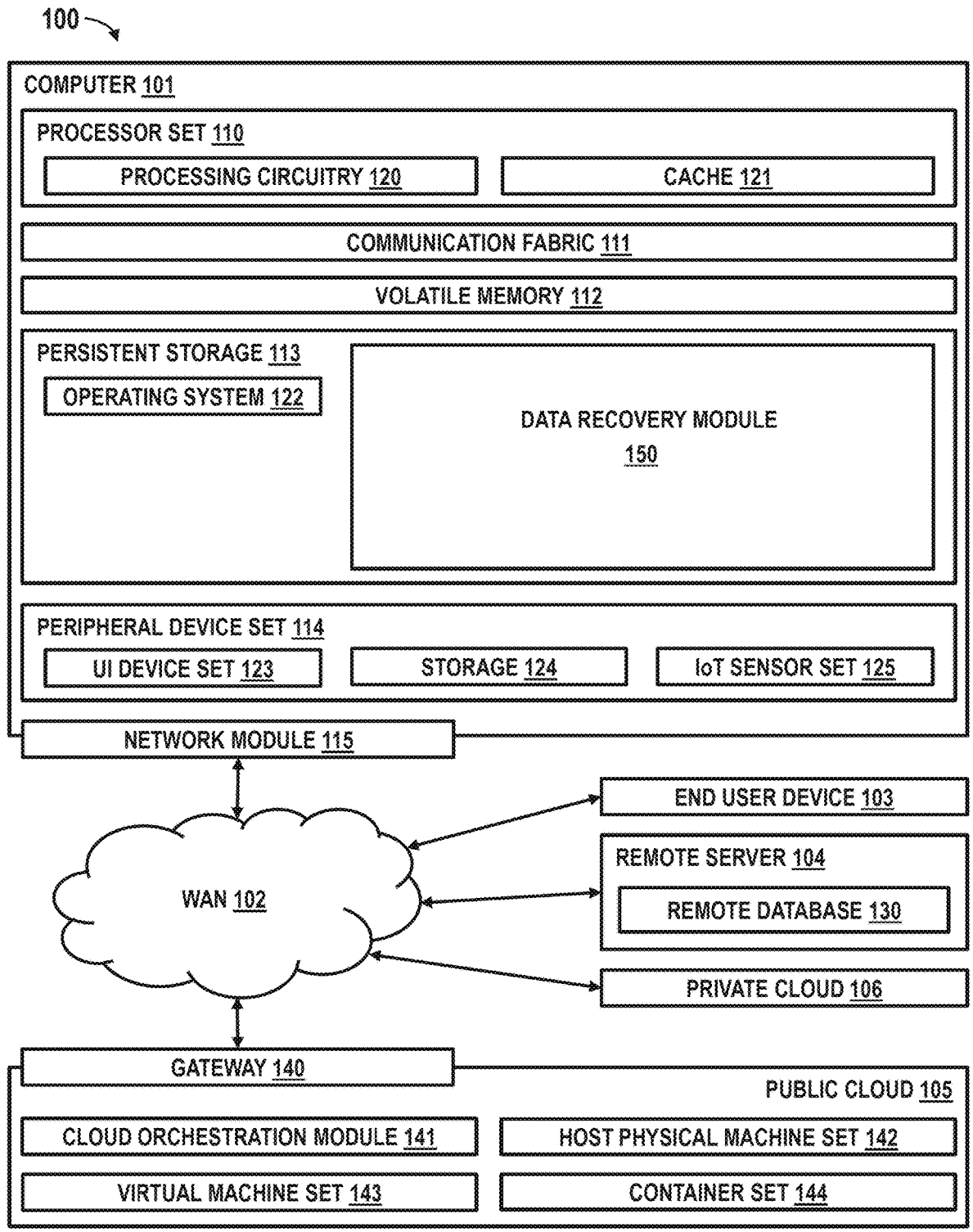
FIG. 1 illustrates a networked computer environment, according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 provides a block diagram of a computing environment 100. The computing environment 100 contains an example of an environment for the execution of at least some of the computer code involved in performing the inventive methods, such as code change differentiator which is capable of improving data management using a data recovery module (150). In addition to this block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Data recovery is very important in businesses today and having a backup for servers is crucial. An important responsibility of a System Administrator is to monitor and manage the backup and recovery of business data, which is the foundation for ensuring the healthy operation of the business environment. When a system failure requires data recovery, it is important to recover the data in the shortest time possible to minimize customer downtime. The current challenge is how to perform data recovery tasks quickly. Data comes from many channels including client machines, software tasks using remote networks, server backup machines and their software usage. The differences between the hardware and software being used as well as the even size and volume of data affect recovery time. Additionally, many of factors may change over time and recovery systems have to be dynamic as many conventional techniques lack a comprehensive consideration of all relevant factors.

Operation and maintenance teams may be responsible for backup and recovery of data on different servers. As discussed, client servers may be complex and varied and include different components (frequent patches, upgrades, etc.). These many factors have to be considered when designing an efficient data backup and recovery system. Type of architecture, hardware, software, and networks availability must be considered on any recovery design as they can potentially influence and constrain the recovery efforts. Sometimes recovery time may be calculated using some known factors such as data size, hard disk capabilities and the write speed. Nonetheless, in many scenarios there may be a lot of unpredictable factors that cause significant differences between the predicted value and the actual value. Consequently, estimating the time for data backup and recovery, as well as how to accelerate data backup and recovery, has also become a challenge in practical operation and maintenance work.

Figure 2:
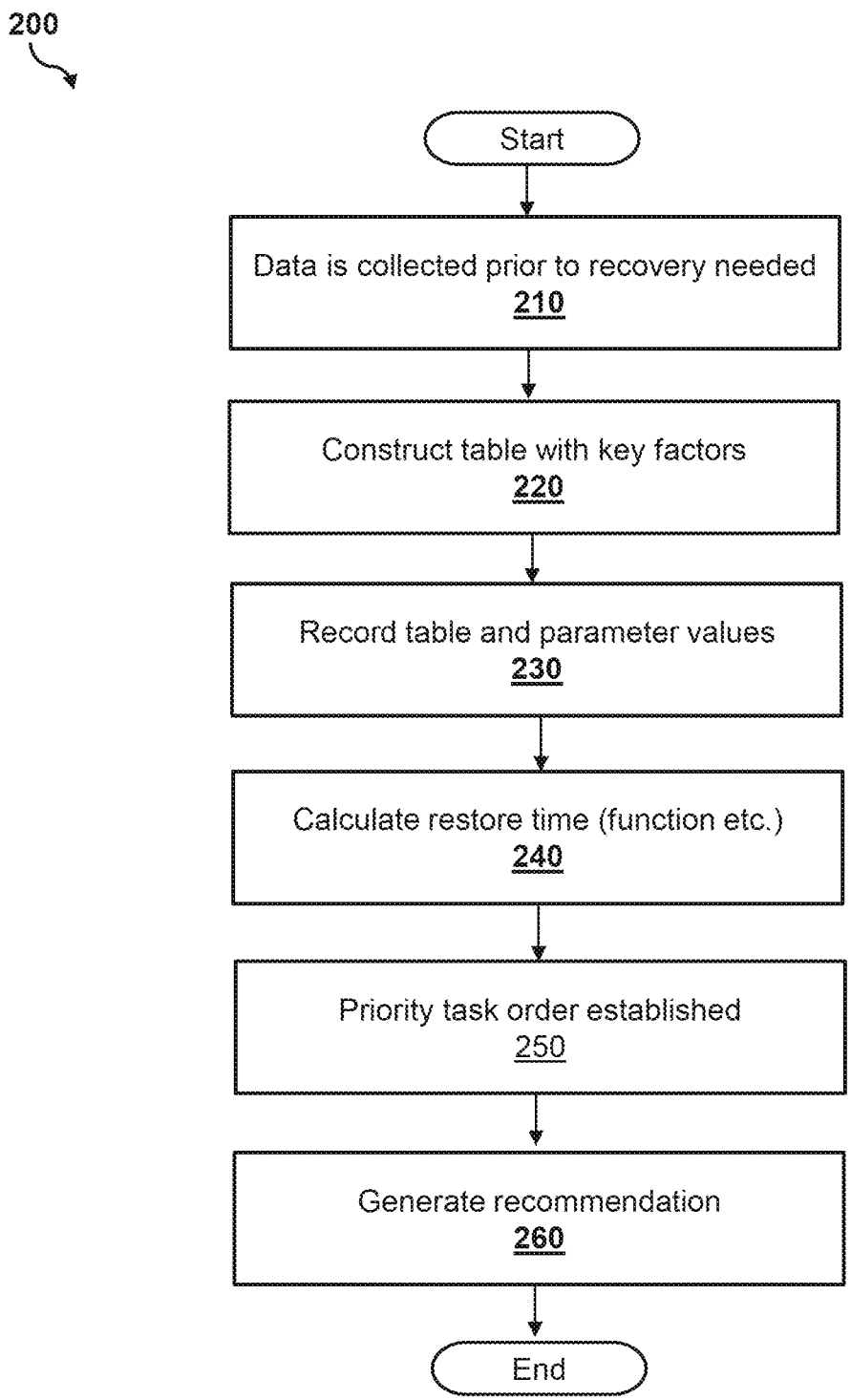
FIG. 2 illustrates an operational flowchart for providing a data backup and recovery process, according to one embodiment.

FIG. 2 is a flowchart providing an illustration of a process 200 that collects and analyzes factors that affect data backup and recovery. Process 200 provides a server/data backup and recovery solution that protects customer data and core system files from loss or damage (such as hardware damage/disaster/system down). In one embodiment, process 200 predicts and dynamically adjusts parameters to provide an optimal recovery time. Process 200 can be used to train Artificial intelligent (AI) engines using one or more machine language models (ML) to also build parameter recommendations for new provisions for data backup recovery process that achieve optimal choice designed for specific businesses. In one embodiment, the recovery time also considers cost considerations in providing recommendations. Process 200 as discussed in the steps below comprehensively considers all factors related to data recovery, optimizes the recovery process, and restores data in the shortest possible time to meet business objectives.

In Step 210, data is collected prior to recovery time. In one embodiment, the data collected can include all parameters related to data backup and recovery tasks. This may include system or network related data and other specific hardware/software data that have to be considered when performing a backup/restore task.

In Step 220, a table is constructed to find key factors based on data backup software in the backup/restore process. In one embodiment, the data that has been collected such as in Step 210 is used for each parameter to construct a two-dimensional data table. In one embodiment this includes the values with respect to time and system parameter values as variables when collecting relevant data. The data is also normalized. In one embodiment, this may further include determining or obtaining samples at a certain restore size interval and recording the values of all parameters in this data recovery process (in the two-dimensional time parameter record table). In one embodiment, dimensionality analysis can be also performed on the table on the collected parameters. The purpose is to dimensionality reduce or simplify a plurality of modeling data inputs. The table is recorded/stored in a database including the parameter values. An example of such a table is provided in FIG. 6.

In Step 230, a predict restore time function is calculated. This is a calculation relating to the completion of the backup/recovery function. In one embodiment, this may include a restore time frame as a target to find the key parameters and use it in determining a prediction for restore time to be completed. In one embodiment, a reference "Goal Seek" may also be calculated. This step is performed after setting different parameter ranges to calculate the recommended parameters to meet customer customization needs for recovery and backup process completion.

In one embodiment, Step 240 may include establishing a regression AI model with restore time as the target variable to find out key parameters which can impact restore time duration.

In Step 250, a task priority order is established. In one embodiment, this can be dependent on the type, importance, and logic of each task backup/recovery and can be customized according to client/customer needs or type of business. In one embodiment, a task priority weight is provided to help in devising a calculation method to assign weights and provide/sort-out parallel tasks that need to be performed simultaneously.

In one embodiment, the regression model and a user defined restoration recommendation model are used cohesively. In one embodiment, a restore recommendation model can be used that incorporates a regression model. In one embodiment, a task execute weights definition (by server type, workload) to create task execution policy). This model provides a recommended combination table after controlling certain parameter ranges. Then, based on the top N options in the combination table, the regression AI model established is used to predict the restore time. An example is provided in FIG. 7 and will be later discussed in more detail.

In Step 260, a prediction recommendation result is generated using the results of Step 240 and 250. The generated result is designed to dynamically optimize and adjust relevant parameters to meet customer recovery/backup (prediction) time frame and particular needs. In other words, the Step 260, can generate a result comprised of a customized recommendation model. In another embodiment, the model may be used to build a predictive recommendation model that can dynamically optimize and adjust relevant parameters.

Figure 3:
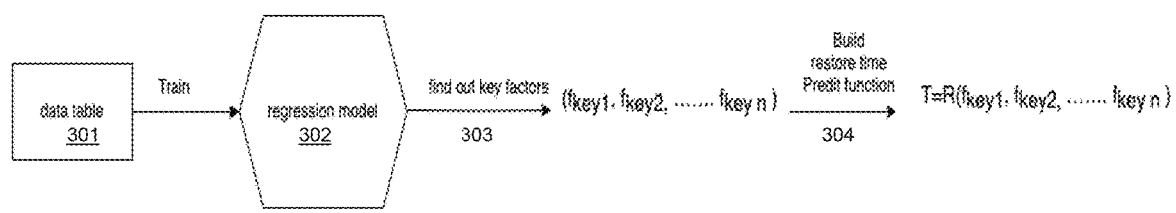
FIG. 3 provides a block diagram illustrating a regression AI model, according to one embodiment.

FIG. 3 provides a block diagram illustrating a build regression AI model to find out one or more key factors as discussed in the process 200. In one embodiment, according to one or more e Parameter Value Types, and a relationship between these parameters, the Parameters can be reduced to perform an easier analysis. In this example, the regression AI model 302 uses data table 301 to find out the key factors 303 which impact restore time duration to build/generate a restore time predict function 304. The build function can then a predict a value:

$$\text{restore speed} = R(f_{key1}, f_{key2}, \ldots f_{keyn})$$

Figure 4:
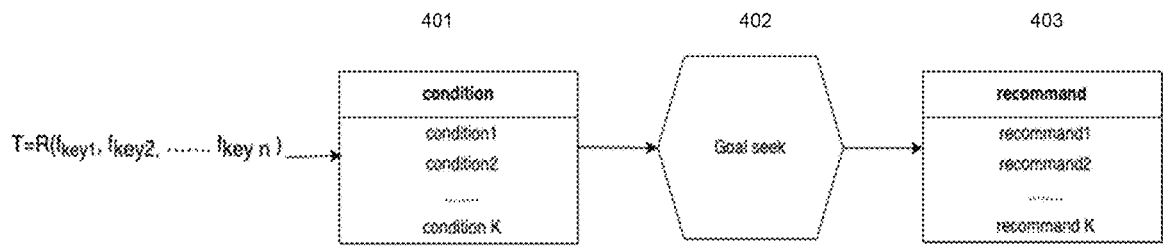
FIG. 4 illustrates a block diagram illustration having a user defined restore model according to a first embodiment.
Figure 8:
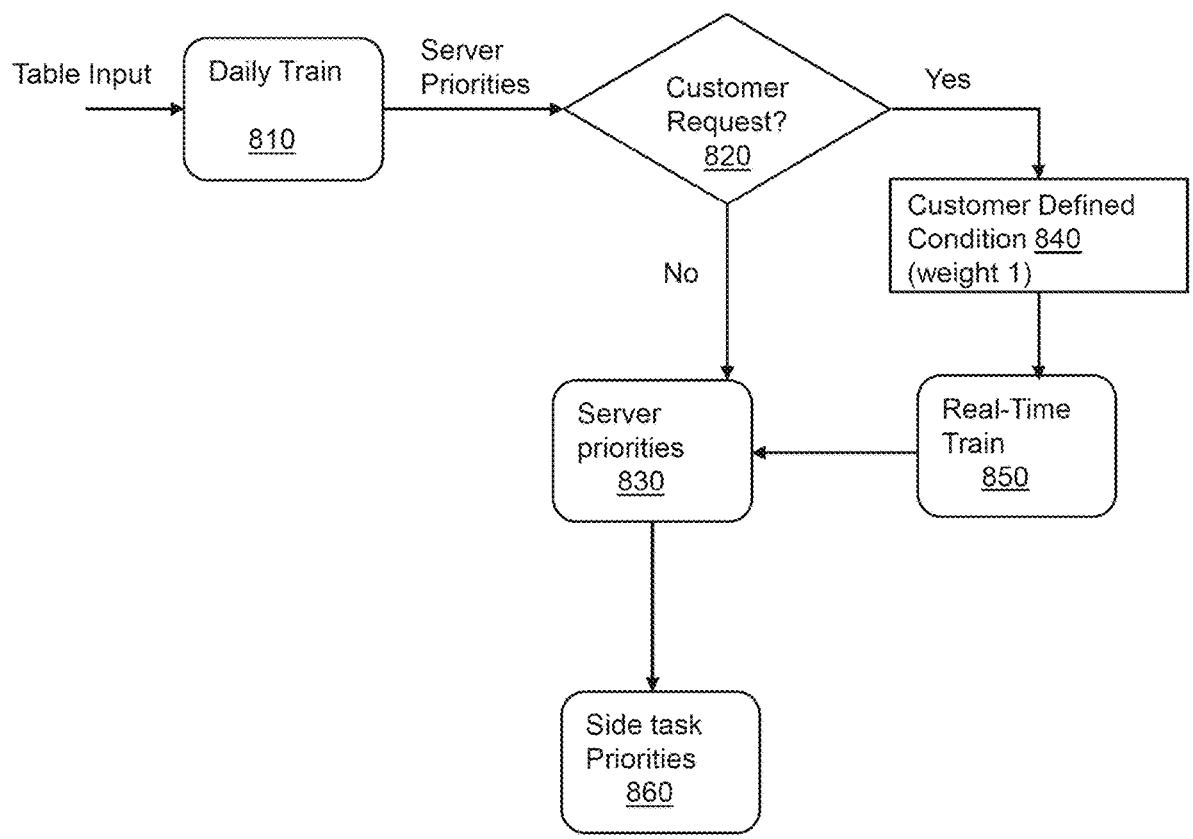
FIG. 8 provides a block diagram of an example of a user defined restore model according to a different embodiment.
Figure 9:
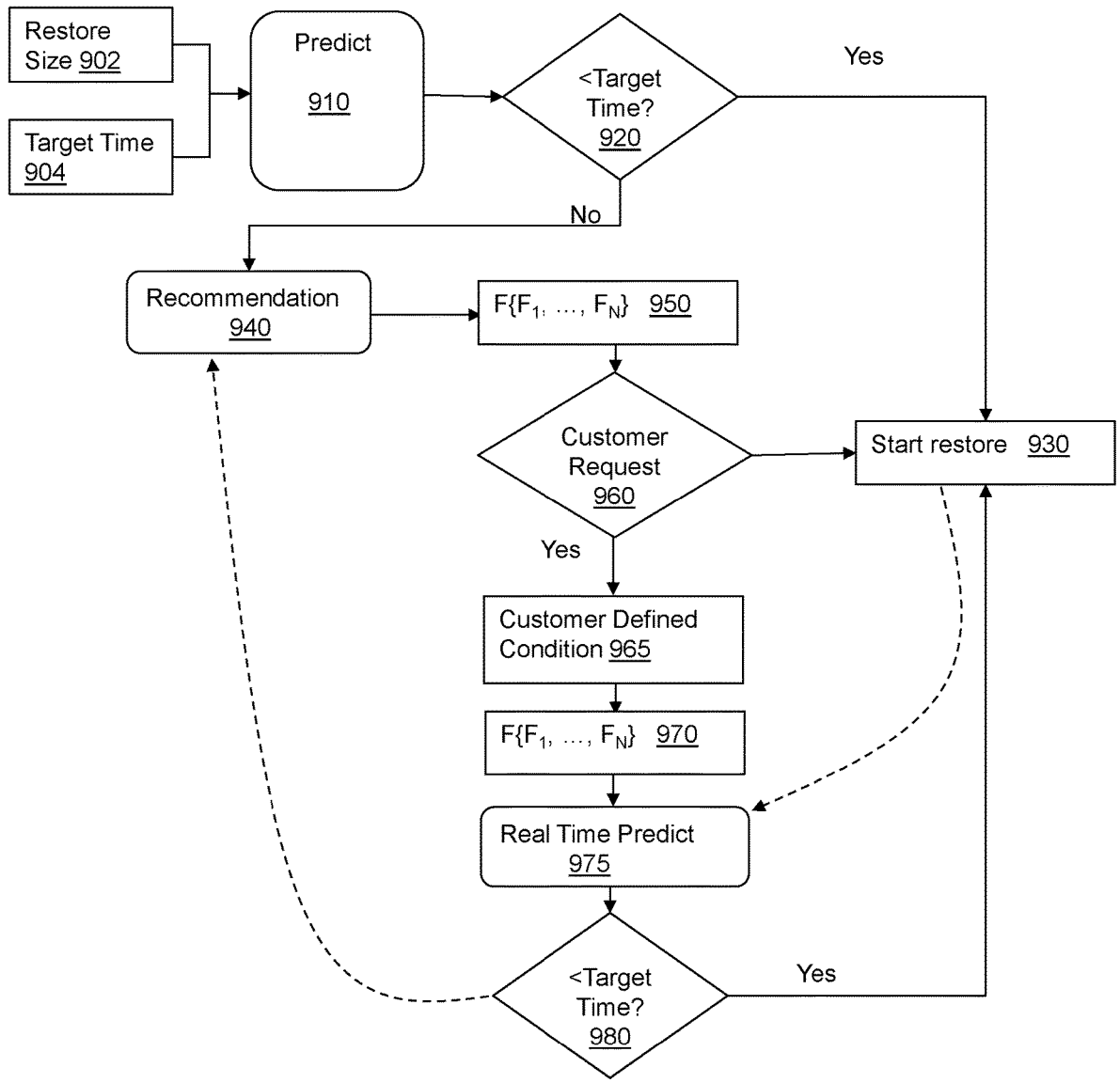
FIG. 9 provides a flowchart illustration of a user defined restore model; according to one embodiment.
Figure 10:
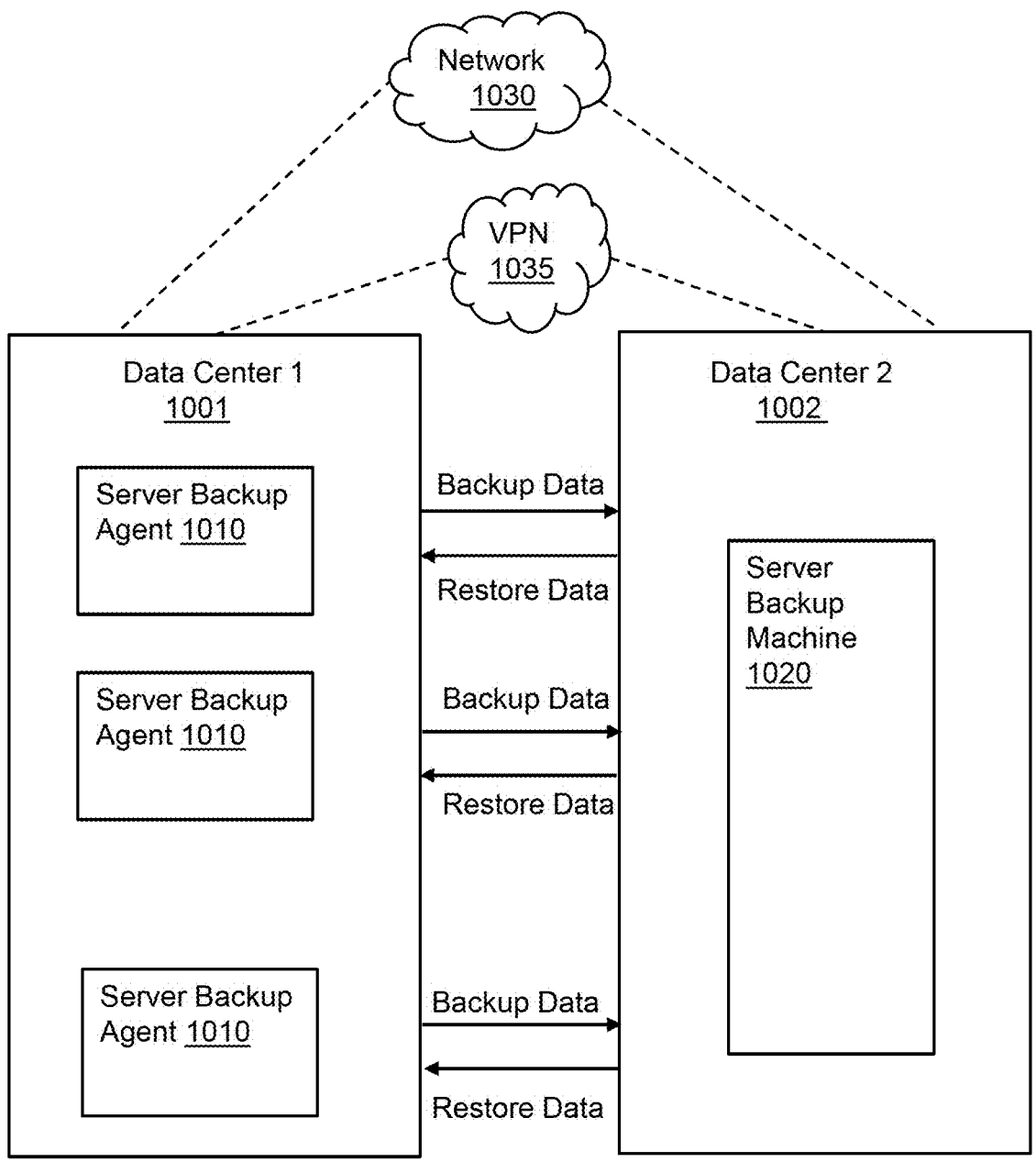
FIG. 10 is a block diagram of a restore architecture; according to one embodiment.

FIG. 4 provides a block diagram illustration of a user defined restore recommendation model that can be implemented using an AI model. FIG. 8 provides a block diagram of an example of a user defined restore recommendation model. FIG. 9 provides another example of a flowchart providing a user defined restore recommendation model. FIG. 10 is a block diagram of showing a restore architecture according to one embodiment. The model provides a recommended combination table after controlling certain parameter ranges. It takes a number of conditions 401 and introduce the goal seek 402 to provide a recommended combination table 403. subsequently, based on the top N options in the combination table, the regression AI model established in step 2 is used to predict the restore time. In one embodiment the recommended combination can be defined as:

$$Y(f_{rd1}, f_{rd2}, \ldots f_{rdn}).$$

An example of this is a table generated as shown in FIG. 5. In FIG. 5, he the recommended combination $Y(f_{rd1}, f_{rd2}, \ldots f_{rd\ n})$ is used under special condition $t_1 < T < t_2$ ($0 < t_1 < t_2$) to generate the recommend factor table 510 with different values of Y and $f_{rd}$.

In FIG. 6, as discussed in conjunction with process 200 of FIG. 2 (Steps 220 and 230) provides an example of the table including variables. As illustrated, a first record having a two-dimensional table is shown by table 610. A record with the average value of each parameter is shown at 620. In this scenario, values were recorded for the average value of each parameter during this time period for 1 MB of data restored. A graph of three parameter value types are also shown in conjunction with graph 630 showing a continuous variable, graph 632 showing a discrete variable and graph 634 showing a constant variable against time.

Figure 7:
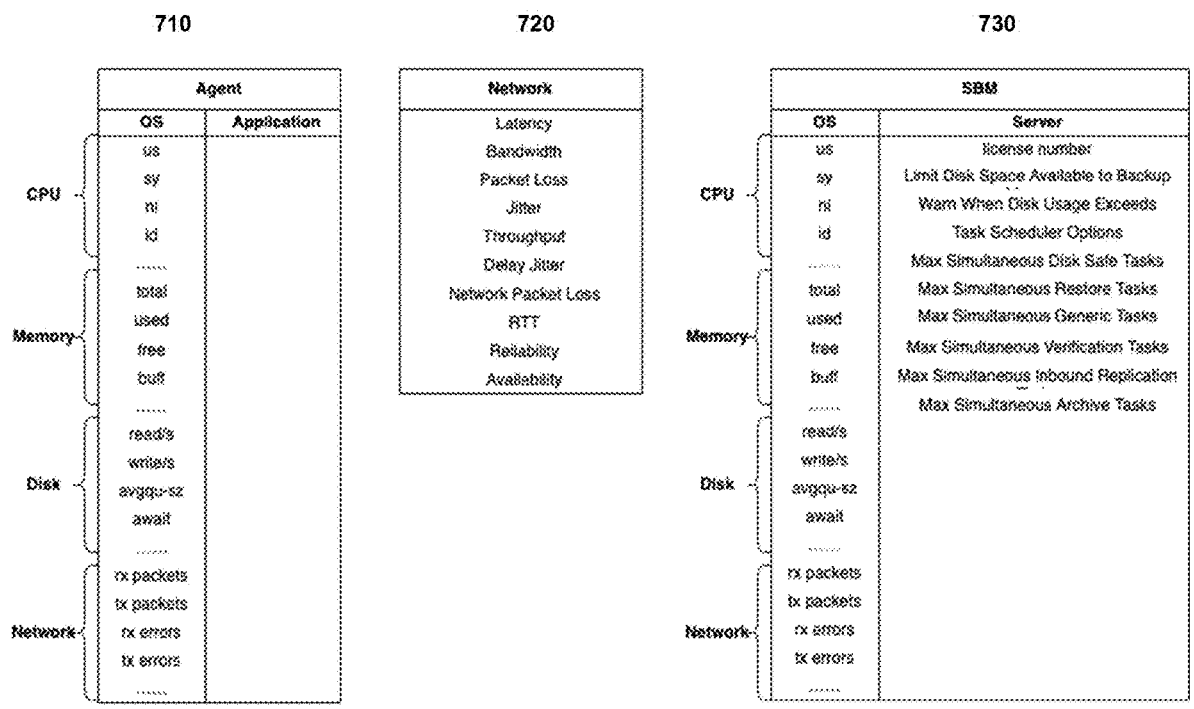
FIG. 7 is an illustration of a table having parameters and factors affecting speed of processing; according to one embodiment.

FIG. 7 provides an example of a restore recommendation model that can incorporate a regression model. The example of FIG. 7 introduces a task execute weights definition (by server type, workload) to create task execution policy). This model provides a recommended combination table after controlling certain parameter ranges. Then, based on the top N options in the combination table, the regression AI model established is used to predict the restore time. FIG. 7 provides a table showing factors affecting restore speed. Table 710 shown the Agent versus factors like CP, Memory, Disk and Network elements. Table 720 shows the different elements in a Network that can affect restore speed and table 730 shows Operating system and system components. In one embodiment, machine language model uses said regression model to generate a recommended combination table by adjusting and controlling a subset of parameter ranges.

FIG. 8 provides a block diagram of an example of a user defined restore recommendation model. Input is provided from the constructed two-dimensional table such as the one shown in conjunction with FIG. 6 having constant and discrete parameters. An example of such a table can be:

| Constant Parameters | Discrete parameters |
| --- | --- |
| Server Type<br>Weight: 0.8 | Last Back Up<br>Weight: 07 |
| Archive Point Limit<br>Weight: 0.6 | If have COS<br>Weight: 0.6 |
| Schedule Slot<br>Weight: 0.4 | Disk Safe Size<br>Weight: 0.5 |

In FIG. 8 the table input above is provided to train the AI (810) as provided in FIG. 4, for example. The weights provided above are considered in conjunction with any customer requests at 820. If there are no customer requests, server priorities established (such as in the table are then considered at 830 and the side task priorities are then completed afterwards as shown in block 860. Otherwise if there is a customer request, those defined considered are prioritized at 840 (given weight of 1.0 as shown), and subsequently the server priorities 820 and side tasks 860 are then considered to full completion.

FIG. 9 provides another example of a flowchart providing a user defined restore recommendation model. In This scenario, the customer can specify a feature to adjust a policy, and the process can then display the optimized restore time in real-time based on the policy as specified by the customer. As can be seen, the process will provide a predict time (910) based on input received from restore size 902 and a possible target time 904. If there are no recommendation and <target time (920), then the process will start the restore at 930. A predict store time function is calculated 950. If there is a customer request, and customer request at 960, the customer defined condition is 965 incorporated and the function updated at 970. The real time predict is provided at 975. If the target time meets the criteria/goal then the restore time (930) is performed, otherwise the process reiterates until the target time is satisfactory (980).

FIG. 10 is a block diagram of showing a restore architecture according to one embodiment. A plurality of server backup agents 1010 are shown residing in a first data center 1001. The server backup agents can be a located on a client server and they can perform a variety of function such as monitoring client data and taking up backup action when necessary. A server backup machine resides in a second data center 1002. The server backup machine can perform a variety of functions such as storing client backup data for a period of time. The server backup machine can be off site even providing this type of backup architecture. The server can have many clients (as shown here as agents) and backup data for all of them, at least for a period of time. As shown by the arrows, each agent 1010 can be sending data to be backup (via the server backup machine) and requesting data to be restored as necessary. The data centers and the server backup agents and server backup machine may be connected to a network or even private VPNs via the cloud at 1030 and 1035 respectively.

The techniques provided addresses the many problems of the prior art. It provides a dynamic recovery system that can incorporate many different factors such as different client environments. The current techniques being used lack a data backup and recovery system that can be based on the characteristics of the software and the environment that client applications reside. As indicated in FIG. 2, in one embodiment, the process 200 can construct a data table with time and system parameter values as variables when collecting relevant data. The data is normalized and machine learning models can be used. In one embodiment, a predict recovery time frame can be established and optimized. In one embodiment, regression AI model is used with restore time as the target variable to find out key parameters which can impact restore time duration. The AI model can be incorporated to provide a recommended combination table after controlling certain parameter ranges. Then, based on the top N options in the combination table, the regression AI model established to predict a restore time proximation. The techniques discussed provides the advantage of comprehensively incorporating all factors related to data recovery. It further optimizes the recovery process and restores data in the shortest possible time to meet the business objectives. In one embodiment, any client preferences and recovery recommendation can also be incorporated in the process.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for backup and restoration of data, comprising:
    obtaining data from a plurality of resources related to a plurality of tasks and an associated task performance for each plurality of tasks, wherein each of said plurality of resources are located in one or more computing networks;
    extracting a plurality of parameters from obtained data and generating a table associating each task with a parameter, wherein said table includes values associated with said parameters with respect to time;
    determining samples at a certain restore size interval and recording all values associated with said parameters in said table during a data recovery process;
    performing a dimensionality analysis on said table on any collected samples to simplify a plurality of modeling data inputs;
    calculating a predict time for recovery of data based on said modeling data inputs when any of said plurality of resources become unavailable based on said table;
    establishing a task priority based on calculated predict time and said table generated to optimize said predict time for data recovery, wherein said task priority has an associated weight to rank each of said plurality of tasks per importance and to sort-out parallel tasks that need to be performed simultaneously; and
    generating a restoration model using said task priority to be used for data recovery during resource unavailability or failure.

2. The method of claim 1, wherein said table is stored in a database.

3. The method of claim 1, further comprising generating a prediction recommendation result to be used for generating said restoration model.

4. The method of claim 1, further comprising: updating said task priority when a user defined restoration recommendation has been provided.

5. The method of claim 1, wherein a predictive model is used to optimize and adjust relevant parameters in generating said restoration model.

6. The method of claim 1, wherein a regression model is used to predict restore time frames based on task priority order established.

7. The method of claim 1, wherein an artificial intelligence engine using a machine language model is used to predict restoration time based on said table.

8. The method of claim 7, wherein a machine language model uses said regression model to generate a recommended combination table by adjusting and controlling a subset of parameter ranges.

9. The method of claim 1, wherein each task is associated with a task execute weight and said weights are used to determine order of task priority.

10. A computer system for providing backup and restoration of data, comprising:
one or more processors, one or more computer-readable memories and one or more computer-readable storage media;
program instructions, stored on at least one of the one or more storage media for execution by at least one of the one or more processors via at least one of the one or more memories, to obtain data from a plurality of resources related to a plurality of tasks and an associated task performance for each plurality of tasks, wherein each of said plurality of resources are located in one or more computing networks;
program instructions, stored on at least one of the one or more storage media for execution by at least one of the one or more processors via at least one of the one or more memories, to extract a plurality of parameters from obtained data and to generate a table associating each task with a parameter, wherein said table includes values associated with said parameters with respect to time;
program instructions, stored on at least one of the one or more storage media for execution by at least one of the one or more processors via at least one of the one or more memories to determine samples at a certain restore size interval and recording all values associated with said parameters in said table during a data recovery process;
program instructions, stored on at least one of the one or more storage media for execution by at least one of the one or more processors via at least one of the one or more memories to perform a dimensionality analysis on said table on any collected samples to simplify a plurality of modeling data inputs;
program instructions, stored on at least one of the one or more storage media for execution by at least one of the one or more processors via at least one of the one or more memories, to calculate a predict time for recovery of data when any of said plurality of resources become unavailable based on said table;
program instructions, stored on at least one of the one or more storage media for execution by at least one of the one or more processors via at least one of the one or more memories, to establish a task priority based on calculated predict time and said table generated to optimize said predict time for data recovery, wherein said task priority has an associated weight to rank each of said plurality of tasks per importance and to sort-out parallel tasks that need to be performed simultaneously; and
program instructions, stored on at least one of the one or more storage media for execution by at least one of the one or more processors via at least one of the one or more memories, to generate a restoration model using said task priority to be used for data recovery during resource unavailability or failure.

11. The computer system of claim 10, further comprising:
program instructions, stored on at least one of the one or more storage media for execution by at least one of the one or more processors via at least one of the one or more memories, to generate a prediction recommendation result to be used for generating said restoration model.

12. The computer system of claim 10, further comprising:
program instructions, stored on at least one of the one or more storage media for execution by at least one of the one or more processors via at least one of the one or more memories, to update said task priority when a user defined restoration recommendation has been provided.

13. The computer system of claim 10, wherein a predictive model is used to optimize and adjust relevant parameters in generating said restoration model.

14. The computer system for claim 10, wherein a regression model is used to predict restore time frames based on task priority order established.

15. The computer system of claim 14, wherein said table is stored in a database and said an artificial intelligence engine uses a machine language model is used to predict restoration time based on said table.

16. The computer system of claim 15, wherein said machine language model uses said regression model to generate a recommended combination table by adjusting and controlling a subset of parameter ranges.

17. The computer system of claim 16, wherein each task is associated with a task execute weight and said weights are used to determine order of task priority.

18. A computer program product for backup and restoration of data, the computer program product comprising:
one or more computer readable storage media;
program instructions, stored on at least one of the one or more storage media for execution by at least one of the one or more processors via at least one of the one or more memories, to obtain data from a plurality of resources related to a plurality of tasks and an associated task performance for each plurality of tasks, wherein each of said plurality of resources are located in one or more computing networks;
program instructions, stored on at least one of the one or more storage media for execution by at least one of the one or more processors via at least one of the one or more memories, to extract a plurality of parameters from obtained data and to generate a table associating each task with a parameter, wherein said table includes values associated with said parameters with respect to time;
program instructions, stored on at least one of the one or more storage media for execution by at least one of the one or more processors via at least one of the one or more memories to determine samples at a certain restore size interval and recording all values associated with said parameters in said table during a data recovery process;
program instructions, stored on at least one of the one or more storage media for execution by at least one of the one or more processors via at least one of the one or more memories to perform a dimensionality analysis on said table on any collected samples to simplify a plurality of modeling data inputs;
program instructions, stored on at least one of the one or more storage media for execution by at least one of the one or more processors via at least one of the one or more memories, to calculate a predict time for recovery of data when any of said plurality of resources become unavailable based on said table;
program instructions, stored on at least one of the one or more storage media for execution by at least one of the one or more processors via at least one of the one or more memories, to establish a task priority based on calculated predict time and said table generated to optimize said predict time for data recovery, wherein said task priority has an associated weight to rank each of said plurality of tasks per importance and to sort-out parallel tasks that need to be performed simultaneously; and program instructions, stored on at least one of the one or more storage media for execution by at least one of the one or more processors via at least one of the one or more memories, to generate a restoration model using said task priority to be used for data recovery during resource unavailability or failure.

\* \* \* \* \*